United States Patent
Tandon et al.

(10) Patent No.: US 9,813,255 B2
(45) Date of Patent: Nov. 7, 2017

(54) COLLABORATION ENVIRONMENTS AND VIEWS

(75) Inventors: Ankit Tandon, Bellevue, WA (US); William Verthein, Sammamish, WA (US); Senthil Velayutham, Sammamish, WA (US); Ross Cutler, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 172 days.

(21) Appl. No.: 13/561,917

(22) Filed: Jul. 30, 2012

(65) Prior Publication Data
US 2014/0032679 A1    Jan. 30, 2014

(51) Int. Cl.
| | | |
|---|---|---|
| G06F 15/16 | (2006.01) | |
| H04L 12/18 | (2006.01) | |
| H04N 7/14 | (2006.01) | |
| H04N 7/15 | (2006.01) | |

(52) U.S. Cl.
CPC ......... *H04L 12/1827* (2013.01); *H04N 7/141* (2013.01); *H04N 7/15* (2013.01)

(58) Field of Classification Search
CPC .... H04N 7/15; H04N 21/4788; H04N 21/435; H04N 7/152; H04L 12/1827; H04L 12/581; H04L 51/04; H04L 65/403; H04L 12/18; H04L 12/1813; G06F 9/4445; G06F 17/30873; G06F 17/243
USPC .............. 709/204–206, 208, 231; 348/14.16, 348/14.07, 14.08; 715/753, 756, 716
See application file for complete search history.

(56) References Cited

U.S. PATENT DOCUMENTS

| | | | |
|---|---|---|---|
| 6,677,979 B1 | 1/2004 | Westfield | |
| 6,816,626 B1 | 11/2004 | Fadel | |
| 7,716,284 B2 * | 5/2010 | Andersen | 709/204 |
| 8,300,557 B2 * | 10/2012 | Sekaran et al. | 370/260 |
| 2004/0230651 A1 * | 11/2004 | Ivashin | H04L 29/06027 709/204 |
| 2004/0236830 A1 * | 11/2004 | Nelson | H04L 29/06027 709/204 |
| 2004/0252185 A1 * | 12/2004 | Vernon et al. | 348/14.08 |

(Continued)

FOREIGN PATENT DOCUMENTS

| | | |
|---|---|---|
| CN | 102263928 A | 11/2011 |
| EP | 0572277 | 12/1993 |

(Continued)

OTHER PUBLICATIONS

Derek Pang, et al.; "ClassX Mobile: Region-of-Interest Video Streaming to Mobile Devices with Multi-Touch Interaction;" MM '11 Proceedings of the 19th ACM international conference on Multimedia; Nov. 29, 2011; pp. 787-788; Stanford, CA; http://www.stanford.edu/~dcypang/doc/ACM_MM_2011/pang_acm_mm_2011_demo.pdf.

(Continued)

*Primary Examiner* — Benjamin M Thieu

(57) ABSTRACT

Provided herein are systems, methods, and software for facilitating collaboration environments. In at least one implementation, a presentation of an initial view of a collaboration scene is presented within a collaboration environment. A portion of the collaboration scene is identified that corresponds to an object of interest selected for separate viewing. A separate presentation within the collaboration environment is initiated related to the portion of the scene corresponding to the object of interest.

17 Claims, 5 Drawing Sheets

(56) References Cited

U.S. PATENT DOCUMENTS

| | | | |
|---|---|---|---|
| 2004/0254982 A1* | 12/2004 | Hoffman | H04L 29/06027 709/204 |
| 2005/0078613 A1* | 4/2005 | Covell | H04L 12/1827 370/260 |
| 2006/0053194 A1* | 3/2006 | Schneider et al. | 709/204 |
| 2006/0089820 A1* | 4/2006 | Yu et al. | 702/186 |
| 2006/0092269 A1* | 5/2006 | Baird | H04L 12/1822 348/14.08 |
| 2006/0168532 A1* | 7/2006 | Stevens et al. | 715/753 |
| 2006/0168533 A1* | 7/2006 | Yip et al. | 715/753 |
| 2006/0235716 A1* | 10/2006 | Mahesh et al. | 705/1 |
| 2007/0081075 A1* | 4/2007 | Canova, Jr. | H04M 3/567 348/14.08 |
| 2007/0198534 A1* | 8/2007 | Hon et al. | 707/10 |
| 2007/0279484 A1 | 12/2007 | Derocher et al. | |
| 2007/0300165 A1* | 12/2007 | Haveliwala | 715/758 |
| 2008/0005244 A1* | 1/2008 | Vernon et al. | 709/204 |
| 2008/0028323 A1* | 1/2008 | Rosen et al. | 715/752 |
| 2008/0059500 A1* | 3/2008 | Symens | 707/101 |
| 2008/0068446 A1* | 3/2008 | Barkley et al. | 348/14.07 |
| 2008/0091526 A1* | 4/2008 | Shoemaker | G06Q 20/10 705/14.55 |
| 2008/0091778 A1* | 4/2008 | Ivashin et al. | 709/204 |
| 2008/0147810 A1* | 6/2008 | Kumar et al. | 709/206 |
| 2009/0287790 A1* | 11/2009 | Upton et al. | 709/208 |
| 2009/0327853 A1* | 12/2009 | Dean | G06F 17/243 715/221 |
| 2010/0026781 A1 | 2/2010 | Ali et al. | |
| 2010/0030578 A1* | 2/2010 | Siddique et al. | 705/3 |
| 2010/0037151 A1* | 2/2010 | Ackerman et al. | 715/753 |
| 2010/0172404 A1 | 7/2010 | Isnardi et al. | |
| 2010/0262925 A1* | 10/2010 | Liu et al. | 715/759 |
| 2010/0309284 A1* | 12/2010 | Samadani et al. | 348/14.08 |
| 2011/0141222 A1 | 6/2011 | Hoelsæter | |
| 2011/0153463 A1* | 6/2011 | Lovelace | G06Q 10/10 705/27.1 |
| 2011/0179045 A1* | 7/2011 | Caldwell | G06Q 10/00 707/754 |
| 2011/0224954 A1* | 9/2011 | Jayasundara | G06F 17/5009 703/1 |
| 2011/0249073 A1* | 10/2011 | Cranfill et al. | 348/14.02 |
| 2011/0249074 A1 | 10/2011 | Cranfill et al. | |
| 2011/0307791 A1* | 12/2011 | Pierre | G06Q 10/10 715/736 |
| 2012/0062688 A1* | 3/2012 | Shen | G06F 3/04886 348/14.03 |
| 2012/0262537 A1* | 10/2012 | Baker et al. | 348/14.08 |
| 2012/0274728 A1* | 11/2012 | Yasoshima | 348/14.07 |
| 2012/0284635 A1* | 11/2012 | Sitrick | G06Q 10/101 715/751 |
| 2013/0065216 A1* | 3/2013 | Mendoza Tascon | G09B 5/10 434/362 |
| 2013/0073980 A1* | 3/2013 | Amendolagine | G06F 3/0481 715/751 |
| 2013/0185252 A1* | 7/2013 | Palmucci | G06F 17/30011 707/608 |
| 2013/0268872 A1* | 10/2013 | Yin et al. | 715/760 |

FOREIGN PATENT DOCUMENTS

| | | |
|---|---|---|
| JP | 2011514043 A | 4/2011 |
| WO | 2011151751 | 12/2011 |

OTHER PUBLICATIONS

J.L. Crowley, et al.; "Vision for Man Machine Interaction;" Proceedings of the IFIP TC2/WG2.7 Working Conference on Engineering for Human-Computer Interaction; Aug. 1995; pp. 1-11; http://www-prima.imag.fr/jlc/papers/Vision.for.MMI.word.pdf.

Adriana Olmos, et al.; "Multiple Angle Viewer for Remote Medical Training;" MTDL '10 Proceedings of the second ACM international workshop on Multimedia technologies for distance leaning; Oct. 29, 2010; pp. 1-6; http://www.cim.mcgill.ca/sre/publications/2010-MTDL.pdf.

Kimiya Yamaashi, et al.; "User-Centered Video: Transmitting Video Images Based on the User's Interest;" CHI '95 Proceedings of the SIGCHI conference on Human factors in computing systems; May 7, 1995; pp. 1-7; Ibaraki, Japan; http://www.sigchi.org/chi95/proceedings/papers/ky_bdy.htm.

"First Office Action and Search Report Issued in Chinese Patent Application No. 201380040728.0", dated Apr. 1, 2017, 10 pages.

"Office Action Issued in European Patent Application No. 13745551.5", dated Apr. 26, 2017, 6 pages.

"Office Action Issued in Japanese Patent Application No. 2015-525479", dated Jul. 6, 2017, 4 Pages. (w/o English Translation).

* cited by examiner

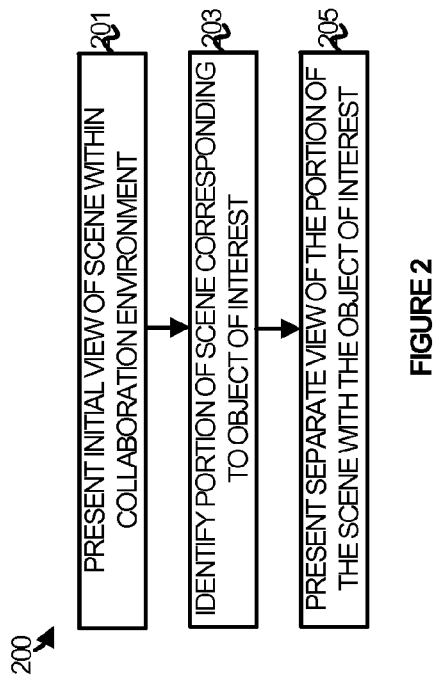
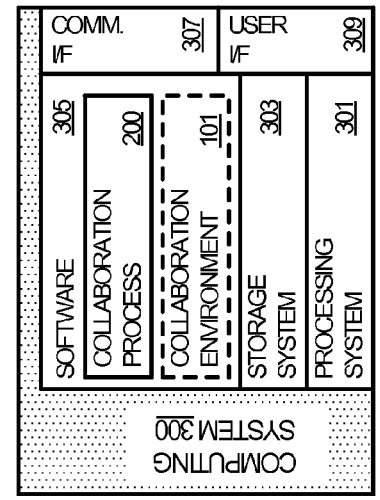
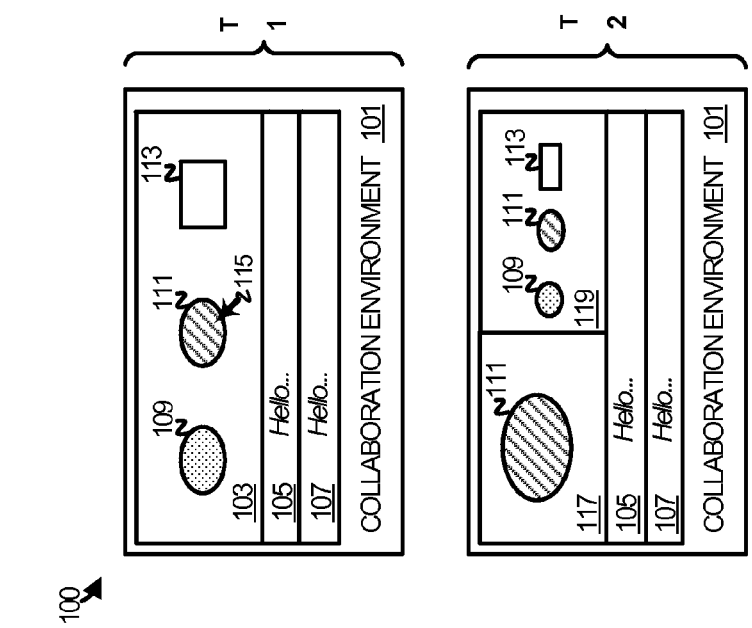

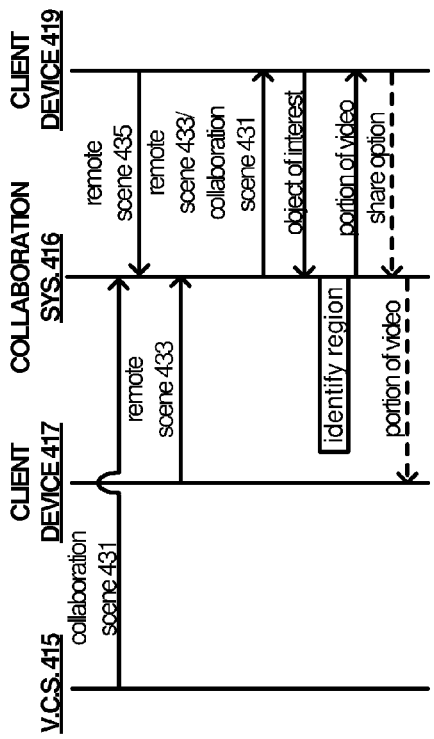
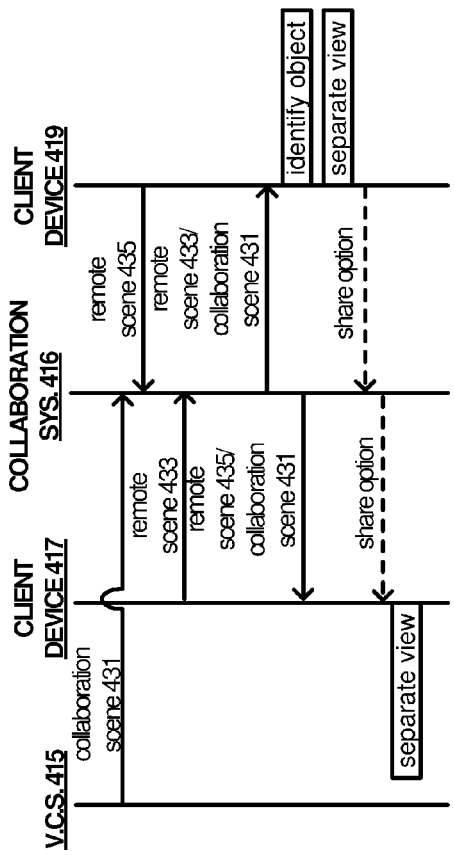

COLLABORATION ENVIRONMENTS AND VIEWS

TECHNICAL FIELD

Aspects of the disclosure are related to computer hardware and software technologies and in particular to collaboration applications and environments.

TECHNICAL BACKGROUND

Collaboration applications and environments allow session participants that may be remote from each other to interact online in a variety of ways or exchange a variety of communications. For instance, collaboration participants may engage in video exchanges, voice calls, instant messaging, white board presentations, and desktop views, or any combination or variation thereof. Microsoft® Lync® is an example application program suitable for providing such collaboration environments.

As the feasibility of collaborating online has increased, so too have the technologies with which collaboration environments can be delivered. For example, collaboration participants may engage in a video conference, voice call, or instant messaging session using traditional desktop or laptop computers, as well as tablets, mobile phones, gaming systems, dedicated collaboration systems, or any other suitable communication device. Different architectures can be employed to deliver collaboration environments including centrally managed and peer-to-peer architectures.

Many collaboration environments allow for emphasizing the presentation of some communications relative to others. In an example scenario involving multiple speakers in a video conference, video associated with the person presently speaking may be visually emphasized over vide of other participants, and may in fact may occur automatically. In addition to these aspects, many environments allow visual preferences and emphasis to be set manually. For example, a user may designate video from one remote scene to be emphasized within an environment over video sourced from another remote scene.

OVERVIEW

Provided herein are systems, methods, and software for facilitating collaboration environments. In at least one implementation, a presentation of an initial view of a collaboration scene is presented within a collaboration environment. A portion of the collaboration scene is identified that corresponds to an object of interest selected for separate viewing. A separate presentation within the collaboration environment is initiated related to the portion of the scene corresponding to the object of interest.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates an operational scenario involving a collaboration environment in an implementation.

FIG. 2 illustrates a collaboration process in an implementation.

FIG. 3 illustrates a computing system in an implementation.

FIG. 7 illustrates an operational sequence involving a collaboration session in an implementation.

FIG. 8 illustrates an operational sequence involving a collaboration session in an implementation.

TECHNICAL DISCLOSURE

Figure 4:
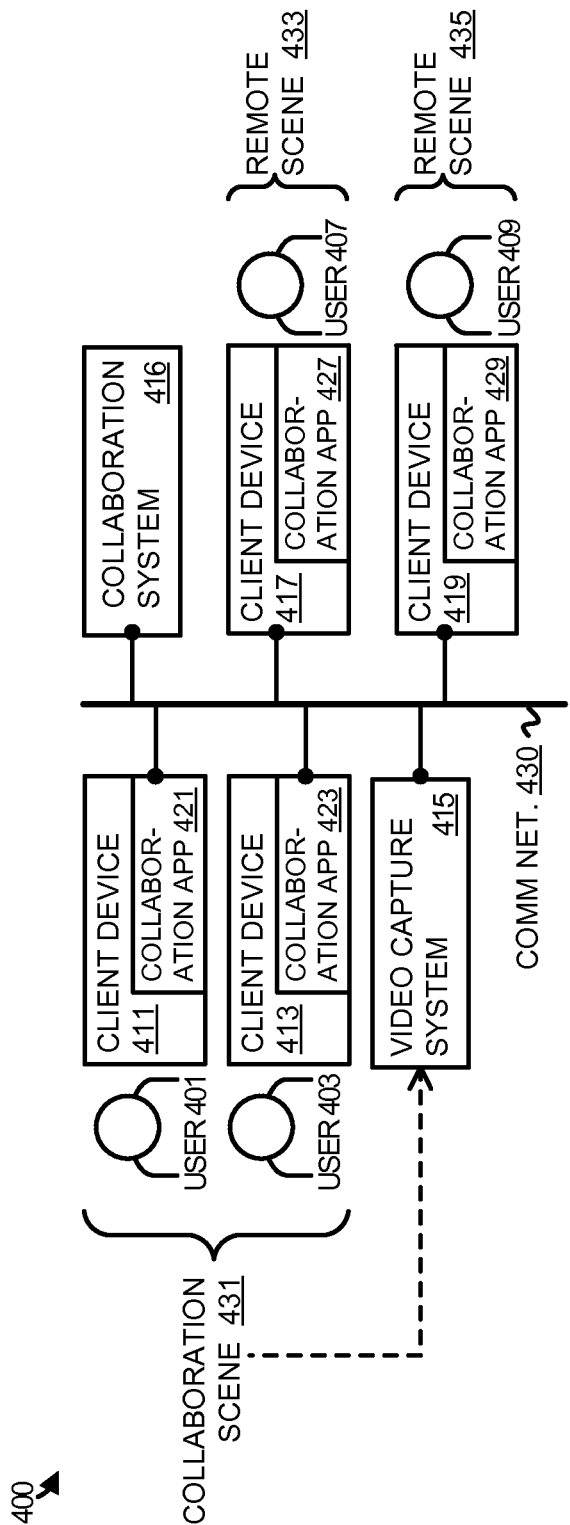
FIG. 4 illustrates a collaboration architecture in an implementation.

Implementations described herein provide for separate views of objects of interest within collaboration environments. In at least one implementation, a collaboration environment may include a view, such as a video presentation window, through which a scene may be viewed by a collaboration participant. The collaboration environment may include other collaboration views, such as an instant message presentation window, that allow the collaboration participant to engage in a collaboration session by way of a variety of communication techniques. Upon an object of interest being identified for separate viewing, a separate view may be presented with the object of interest displayed therein. The object of interest may be identified in a variety of ways, such as by a mouse click, a hover operation, a touch, or the drawing of a region of interest that includes the object.

The object of interest may be a collaboration participant in a collaboration session with other collaboration participants. In some scenarios, video may be captured of a collaboration scene that includes multiple collaboration participants. A remote attendee to the collaboration session, experiencing a single view of the multiple collaboration participants, may wish to focus on one of the collaboration participants. By way of a suitable user input mechanism, a collaboration participant may be identified in the view as of-interest for separate viewing. A separate view of the collaboration participant may then be generated and presented to the remote attendee.

In various implementation scenarios, an initial view of a collaboration scene may be modified, and the modified view of the scene presented simultaneously with the separate view. For example, the separate view may presented within a viewing area in a visual emphasize manner, while the modified view may be a relatively smaller view of the collaboration scene than the initial view. In some scenarios, a second portion of a collaboration scene corresponding to a second object of interest may also be selected for separate viewing and presented in a second separate view. A remote view of another remote attendee or attendees may also be presented along with the separate view.

FIG. 1 illustrates an operational scenario 100 involving collaboration environment 101 in an embodiment. In operational scenario 100, an initial state of collaboration environment 101 is depicted at T1. Next, collaboration environment 101 is depicted in a different state at time T2. In particular, collaboration environment 101 initially presents view 103 of a scene. Upon an object of interest in the scene being identified for separate viewing, as will be discussed in more detail below, collaboration environment 101 transitions to a different state whereby view 117 and view 119 are presented.

View 103 includes object 109, object 111, and object 113. Objects 109, 111, and 113 may be any objects in a scene captured within video of the scene, such as people, equipment, displays, or other objects. For example, a video capture device (not shown) may be configured to capture the scene having the objects 109, 111, and 113 positioned or otherwise stationed therein. In some scenarios, the scene may be a conference room or other gathering space suitable for hosting a collaboration session, such as a group meeting.

Collaboration environment 101 also includes instant messaging views 105 and 107. Instant messaging views 105 and 107 are provided merely as examples of other communication modalities, in addition to view 103, that may be provided by a collaboration application capable of presenting view 103. Other communication modalities that may be presented along with view 103 include voice calling, white board sharing, and desktop sharing modalities. One such collaboration application is Lync® from Microsoft®.

In operation, a selection 115 or other similar indication of an object of interest may be made with respect to any of the objects in view 103. In this example, object 111 is identified as an object of interest by way of selection 115. Selection 115 may be accomplished using any of a number of well-known selection mechanisms, such as a mouse click or a touch. In addition, a region of interest may be drawn around the object of interest using a mouse, a touch, or other suitable input.

An object of interest having been identified, collaboration environment 101 is transitioned to a different state at time T2. In this subsequent state, view 117 is presented with a focus given to object 111, previously identified as the object of interest. In addition, view 119 is presented including objects 109, 111, and 113. View 119 is a modified view of the scene initially presented within view 103. Objects 109, 111, and 113 are presented in view 119 as proportionally smaller than as presented in view 103 to demonstrate that view 119 may present a reduced view of the scene relative to view 103. View 119 is optional and is provided merely for illustrative purposes.

FIG. 2 illustrates a collaboration process 200 that may be implemented using a suitable computing system, such as computing system 300 discussed below with respect to FIG. 3 to facilitate the presentation of collaboration environments. The following discussion of collaboration process 200 will proceed with respect to FIG. 1.

To begin, an initial view of a scene is presented within collaboration environment 101 (step 201). As discussed above, the scene may include a variety of objects, such as people, equipment, or any other type of object. In one example, the scene may be a conference room or other similar meeting environment in which people may gather for a collaboration session. The scene may be captured by way of a video capture device or other similar equipment and provided for presentation within collaboration environment 101.

Next, a portion of the scene corresponding to an object of interest is identified (step 203). Identifying the portion of the scene corresponding to the object of interest may occur in response to the object itself being identified. Optionally, a region of interest surrounding or otherwise related to the object of interest may be identified. Determining which portion of the scene corresponds to the object of interest may be accomplished based on any number of well-known video processing factors, rules, and procedures.

In step 205, a view 117 of the previously identified portion of the scene is presented within collaboration environment 101. View 117 may be considered a separate view in that it is a new view of the scene relative to view 103. A modified view of view 103 may optionally be presented simultaneously with view 117, exemplified by view 119 in operational scenario 100.

Note that while collaboration process 200 refers generally to presenting views within a collaboration environment, initiating the presentation of such views may be considered within the scope of the disclosure. Thus, a variation of collaboration process 200 may include initiating a presentation, within the collaboration environment, of an initial view of a collaboration scene captured in a video stream, identifying a portion of the collaboration scene corresponding to an object of interest in the collaboration scene selected for separate viewing, and initiating a separate presentation, within the collaboration environment, of a separate view comprising the portion of the collaboration scene corresponding to the object of interest.

Referring now to FIG. 3, computing system 300 is generally representative of any computing system or systems on which collaboration process 200 or variations thereof may be suitably implemented. Optionally, computing system 300 may also be suitable for implementing collaboration environment 101. Examples of computing system 300 include server computers, client computers, virtual machines, distributed computing systems, personal computers, mobile computers, media devices, Internet appliances, desktop computers, laptop computers, tablet computers, notebook computers, mobile phones, smart phones, gaming devices, and personal digital assistants, as well as any combination or variation thereof.

Computing system 300 includes processing system 301, storage system 303, software 305, and communication interface 307. Computing system 300 also includes user interface 309, although user interface 309 is optional. Processing system 301 is operatively coupled with storage system 303, communication interface 307, and user interface 309. Processing system 301 loads and executes software 305 from storage system 303. When executed by computing system 300 in general, and processing system 301 in particular, software 305 directs computing system 300 to operate as described herein for collaboration process 200 or variations thereof. Computing system 300 may optionally include additional devices, features, or functionality not discussed here for purposes of brevity and clarity.

Referring still to FIG. 3, processing system 301 may comprise a microprocessor and other circuitry that retrieves and executes software 305 from storage system 303. Processing system 301 may be implemented within a single processing device but may also be distributed across multiple processing devices or sub-systems that cooperate in executing program instructions. Examples of processing system 301 include general purpose central processing units, application specific processors, and logic devices, as well as any other type of processing device, combinations of processing devices, or variations thereof.

Storage system 303 may comprise any storage media readable by processing system 301 and capable of storing software 305. Storage system 303 may include volatile and nonvolatile, removable and non-removable media implemented in any method or technology for storage of information, such as computer readable instructions, data structures, program modules, or other data. Storage system 303 may be implemented as a single storage device but may also be implemented across multiple storage devices or subsystems. Storage system 303 may comprise additional elements, such as a controller, capable of communicating with processing system 301.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software 305 may be implemented in program instructions and among other functions may, when executed by computing system 300, direct computing system 300 to initiate a presentation, within a collaboration environment, of an initial view of a collaboration scene captured in a video stream, identify a portion of the collaboration scene corresponding to an object of interest in the collaboration scene selected for separate viewing, and initiate a separate presentation, within the collaboration environment, of a separate view including the portion of the collaboration scene corresponding to the object of interest. Software 305 may include additional processes, programs, or components, such as operating system software or other application software. Software 305 may also comprise firmware or some other form of machine-readable processing instructions executable by processing system 301.

In general, software 305 may, when loaded into processing system 301 and executed, transform processing system 301, and computing system 300 overall, from a general-purpose computing system into a special-purpose computing system customized to facilitate a collaboration session as described herein for each implementation. Indeed, encoding software 305 on storage system 303 may transform the physical structure of storage system 303. The specific transformation of the physical structure may depend on various factors in different implementations of this description. Examples of such factors may include, but are not limited to the technology used to implement the storage media of storage system 303 and whether the computer-storage media are characterized as primary or secondary storage.

For example, if the computer-storage media are implemented as semiconductor-based memory, software 305 may transform the physical state of the semiconductor memory when the program is encoded therein. For example, software 305 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 300 is generally intended to represent a computing system with which software 305 is deployed and executed in order to implement collaboration process 200 (and variations thereof) and optionally render collaboration environment 101. However, computing system 300 may also represent any computing system on which software 305 may be staged and from where software 305 may be distributed, transported, downloaded, or otherwise provided to yet another computing system for deployment and execution, or yet additional distribution.

Referring again to FIG. 1, through the operation of computing system 300 employing software 305, transformations may be performed with respect to collaboration environment 101. As an example, collaboration environment 101 could be considered transformed from one state to another when subject to collaboration process 200 or variations thereof. In a first state, collaboration environment 101 includes view 103 of scene. Upon identifying an object of interest in the scene, a corresponding portion of the scene is presented via view 117, thereby collaboration environment 101 to a second, different state.

Referring again to FIG. 3, communication interface 307 may include communication connections and devices that allow for communication between computing system 300 other computing systems not shown over a communication network or collection of networks (not shown). Examples of connections and devices that together allow for inter-system communication include network interface cards, antennas, power amplifiers, RF circuitry, transceivers, and other communication circuitry. The aforementioned network, connections, and devices are well known and need not be discussed at length here.

User interface 309 may include a mouse, a voice input device, a touch input device for receiving a gesture from a user, a motion input device for detecting non-touch gestures and other motions by a user, and other comparable input devices and associated processing elements capable of receiving user input from a user. Output devices such as a display, speakers, printer, haptic devices, and other types of output devices may also be included in user interface 309. The aforementioned user input devices are well known in the art and need not be discussed at length here. User interface 309 may also include associated user interface software executable by processing system 301 in support of the various user input and output devices discussed above. Separately or in conjunction with each other and other hardware and software elements, the user interface software and devices may provide a graphical user interface, a natural user interface, or any other kind of user interface.

FIG. 4 illustrates collaboration architecture 400 in an implementation. Collaboration architecture 400 is representative of any computing and communications architecture suitable for facilitating collaboration sessions for users. Collaboration architecture 400 includes client device 411, client device 413, client device 417, and client device 419. Collaboration architecture 400 also includes video capture system 415 and collaboration system 416. Note that client devices 411, 413, 417, and 419 are illustrated for exemplary purposes and not all need be present within collaboration architecture 400.

Client devices 411, 413, 417, and 419 are representative of any device or devices capable of presenting collaboration environments. Examples of client devices 411, 413, 417, and 419 include desktop or laptop computers, as well as tablets, mobile phones, gaming systems, dedicated collaboration systems, and any other suitable communication and computing devices.

Collaboration applications 421, 423, 427, and 429 are representative of any applications or application components executable entirely or in part by client devices 411, 413, 417, and 419 respectively to at least initiate the presentation of collaboration environments and possibly present them, such as Microsoft® Lync®. A variety of application models may be used to implement collaboration applications 421, 423, 427, and 427, including locally installed models, hosted or web-based models, hybrid models, and streaming models, as well as any combination or variation thereof.

Video capture system 415 is representative of any system or sub-system capable of capturing scenes and providing captured video of the scenes to other systems. Video capture system 415 may be a stand-alone device, as illustrated in FIG. 4, but may also be integrated within or distributed across other devices, such as client devices 417 and 419.

Collaboration system 416 is representative of any communication system capable of managing collaboration sessions. Collaboration system 416 may perform various collaboration functions, such as session registration, communication routing, and video routing. Collaboration system 416 may be implemented as a stand-alone system, as illustrated in FIG. 4, but may also be integrated with or distributed across other devices.

Communication network 430 is representative of any network or collection of networks capable of facilitating or otherwise allowing for communication between the various elements of collaboration architecture 400.

In operation, collaboration architecture 400 allows users to engage in collaboration sessions from various locations, possibly remote from each other. With respect to FIG. 4, an implementation scenario is illustrated whereby users 401 and 403 engage in a collaboration session with user 407 and user 409. In this implementation, it is assumed for exemplary purposes that user 401 and user 403 are co-located and may be considered part of collaboration scene 431. User 407 is illustrated as located remotely from users 401 and 403 and may be considered part of remote scene 433. Similarly, user 409 may be considered part of remote scene 435.

As collaboration scene 431 is captured by video capture system 415, video information is generated and communicated to collaboration system 416 for distribution to other devices that may have registered on the session. Similarly, client device 417 captures remote scene 433 and communicates associated video information to collaboration system 416. Client device 419 captures remote scene 435 and also communicates associated video information to collaboration system 416.

Figure 5:
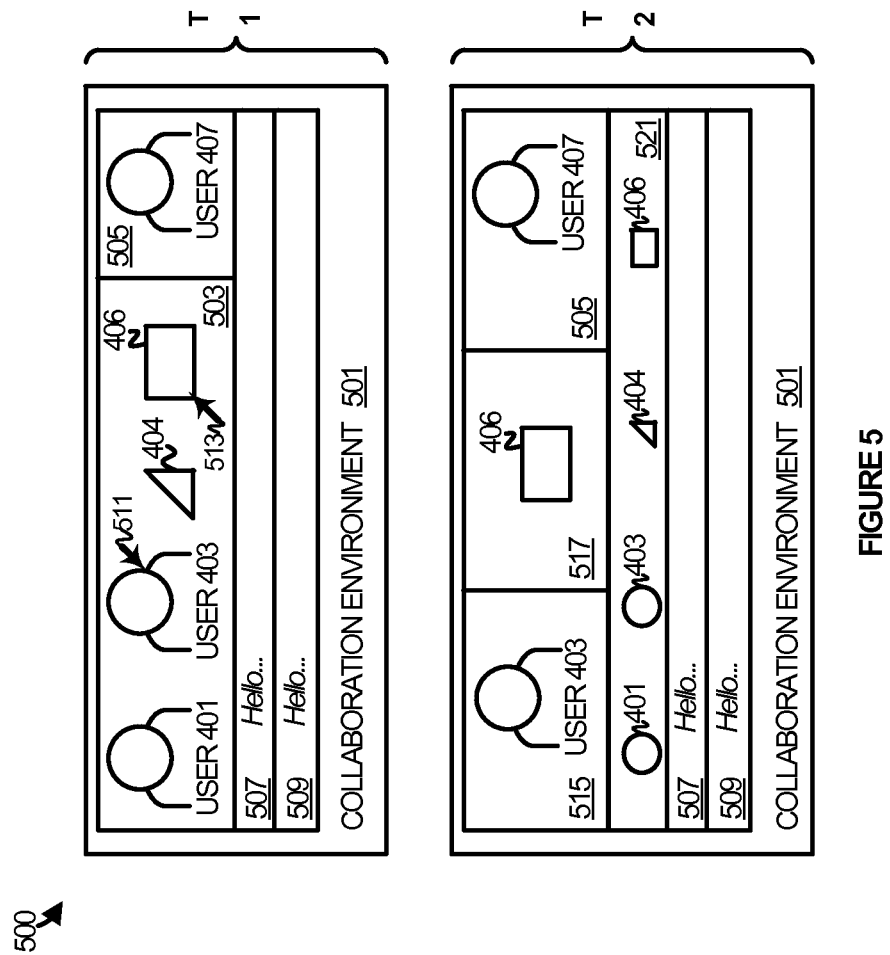
FIG. 5 illustrates an operational scenario involving a collaboration environment in an implementation.

Collaboration system 416 then distributes the video to client devices registered or otherwise joined to the collaboration session for presentation within collaboration environments. FIG. 5 presents one example operational scenario that may be experienced from the perspective of user 409 by way of client device 419 and collaboration application 429. FIG. 5 presents another example operational scenario that may be experience from the perspective of user 407 and user 409 by way of client device 417 and client device 419 respectively, and collaboration application 427 and collaboration application 429 respectively.

Referring now to FIG. 5, operational scenario 500 is illustrated. In operational scenario 500, an initial state of collaboration environment 501 is depicted at time T1. Collaboration environment 501 is then depicted in a different state at time T2. Initially, collaboration environment 501 includes view 503 of collaboration scene 431. Upon objects of interest in the scene being identified for separate viewing, as will be discussed in more detail below, collaboration environment 501 transitions to a different state whereby separate views are newly presented.

In particular, view 503 within collaboration environment 501 includes user 401, user 403, object 404 and object 406. While not earlier presented as part of collaboration scene 431, object 404 and object 406 may be representative of any objects that may be captured within collaboration scene 431, such as a white board or other such presentation tools. Collaboration environment 501 also includes view 505 of remote scene 433, including user 407. As mentioned, operational scenario 500 is discussed from the vantage point of user 409. Thus, remote scene 435 is not presented within collaboration environment 501, although it would be possible to present remote scene 435 within collaboration environment 501.

Collaboration environment 501 also includes instant messaging views 507 and 509. Instant messaging views 507 and 509 are provided merely as examples of other communication modalities that may be provided by collaboration application 429, in addition to views 503 and 505. Rather, a variety of communication modalities that may be presented along with views 503 and 505, including voice calling, white board sharing, and desktop sharing modalities.

In operation, a selection or other similar indication of an object of interest may be made with respect to any of the objects in view 503 or view 505. In this example scenario, user 403 is identified as an object of interest by way of selection 511. In addition, object 406 is identified as an object of interest by way of selection 513. Selections 511 and 513 may be accomplished using any of a number of well-known selection mechanisms, such as a mouse click or a touch. In addition, a region of interest may be drawn around the object of interest using a mouse, a touch, or other suitable input.

An object of interest having been identified, collaboration environment 501 is transitioned to a different state at time T2. In this subsequent state, view 515 is presented with a focus given to user 403, previously identified as the object of interest. View 517 is also presented with a focus given to object 406, also previously identified as an object of interest. View 505 remains presented within collaboration environment 501, allowing user 409 to maintain a view of remote scene 433.

In addition, collaboration environment 501 includes view 521 of collaboration scene 431. Collaboration scene 431 includes user 401, user 403, object 404, and object 406. View 521 is a modified view of collaboration scene 431 as initially presented within view 503. For example, user 401, user 403, object 404, and object 406 are presented in view 521 as proportionally smaller than as presented in view 503 to demonstrate that view 521 may present a reduced view of the scene relative to view 503. View 521 is optional and is provided merely for illustrative purposes.

Figure 6:
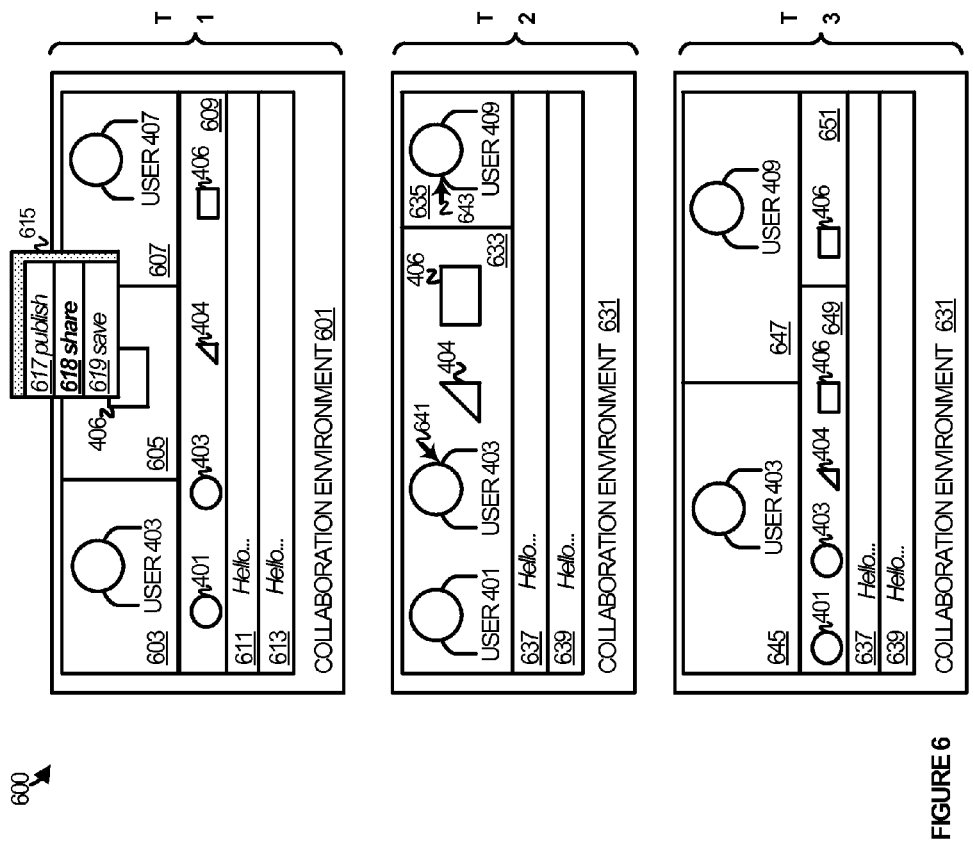
FIG. 6 illustrates an operational scenario involving a collaboration environment in an implementation.

Referring now to FIG. 6, another operational scenario 600 is illustrated involving collaboration environment 601 as may be experienced by user 409 operating client device 419, and also involving collaboration environment 631 as may be experienced by user 407 operating client device 417. In fact, the interaction of user 409 with collaboration environment 601 may potentially drive what content is presented within collaboration environment 631, and thus what content is experienced by user 407.

User 409 may configure collaboration environment 601 in a variety of ways, layouts, and the like. In operational scenario 600, it is assumed for illustrative purposes that user 403 and object 406 have been selected for separate viewing. One such operational example is discussed above with respect to FIG. 5. Thus, collaboration environment 601 includes view 603 presenting user 403 and view 605 presenting object 406. Collaboration environment 601 also includes view 607 of user 407, as well as view 609 of collaboration scene 431. Instant messaging views 611 and 613 are also included in collaboration environment 601.

In operation, collaboration options may be surfaced with respect to an object of interest presented within a view at time T1. In operational scenario 600, collaboration option menu 615 is surfaced with respect to object 406. This may occur in response to a hover operation, a right-click operation, a touch, or some other suitable selection mechanism. Collaboration option menu 615 includes a publish option 617, a share option 618, and a save option 619. The options illustrated as included in collaboration option menu 615 are representative of any option related to a separate view, such as views 603 and 605, allowing for collaboration functions to be initiated with respect to the separate view.

Further in operational scenario 600, it is assumed for illustrative purposes that user 409 has selected share option 418, allowing view 605 to be shared with other collaboration participants. It is further assumed that user 409 elects to share view 605 with user 407. Towards that end, user 407 may be presented with a suggested view in response to share option 618 being selected. Communicating the particular portion of the video corresponding to the share option may be considered a collaboration function.

With respect to user 407, collaboration environment 631 is representative of an environment that may be experienced by user 407 when engaged in a collaboration session. Similar to collaboration environment 601, collaboration environment 631 includes a view 633 of collaboration scene 431, including user 401, user 403, object 404, and object 406. Collaboration environment 631 also includes view 635 of user 409 in remote scene 435. Instant messaging views 637 and 639 are also included in collaboration environment 631.

In operation, it is assumed for illustrative purposes that user 407 has identified user 403 and user 409 as objects of interest at time T2, as represented by selections 641 and 643 respectively. At time T3, collaboration environment 631 has changed to reflect the selections made by user 407. For example, at time T3, collaboration environment 631 includes view 645 of user 403 and view 647 of user 409. In addition, collaboration environment 631 includes view 649 of collaboration scene 431, which may be a reduced version of view 633 presented earlier at time T1.

Finally, at time T3 collaboration environment 631 includes view 651. View is representative of a view suggested by user 409 by way of share option 618 selected at time T1 and discussed above. View 651 includes object 406, selected earlier by user 409 to be shared with other collaboration participants. In this manner, user 409 is able to present to user 407 a suggested view of a portion of collaboration scene 431. User 407 may also be able to interact with collaboration environment 631 to present user 409 with suggested views through collaboration environment 601.

FIG. 7 illustrates in operational sequence involving a collaboration session involving some of the elements of collaboration architecture 400 illustrated in FIG. 4. In operation, video capture system 415 captures video of collaboration scene 431 and responsively generates and transfers corresponding video information to collaboration system 416 for distribution on the session. At the same time, or nearly simultaneously, client device 419 may also capture video, of remote scene 435, and generate and transfer corresponding video information to collaboration system 416 for distribution on the session. Client device 417 also captures and delivers video of remote scene 433 to collaboration system 416.

Collaboration system 416 transmits the video information, possibly as separate video streams but also possibly as an integrated video stream, to client device 419, for presentation within a collaboration environment. Collaboration environment 501 and collaboration environment 601, discussed with respect to FIG. 5 and FIG. 6, are representative of such collaboration environments. Upon selection of an object of interest, client device 419 communicates the identity of the object of interest in a scene to collaboration system 416. Collaboration system 416 responsively identifies a portion of the video corresponding to the object of interest and transfers the portion of the video to client device 419. Client device 419 may then present a separate view of the object of interest within the collaboration environment.

User 409 may optionally determine to share a view with other collaboration participants, such as user 407 discussed above with respect to FIG. 6. In such a case, client device 419 may communicate the share option to collaboration system 416. Collaboration system 416 may then provide the corresponding portion of the video to client device 417 for presentation within a separate view.

FIG. 8 illustrates another operational sequence involving a collaboration session involving some of the elements of collaboration architecture 400 illustrated in FIG. 4. In operation, video capture system 415 captures video of collaboration scene 431 and responsively generates and transfers corresponding video information to collaboration system 416 for distribution on the session. At the same time, or nearly simultaneously, client device 419 may also capture video, of remote scene 435, and generate and transfer corresponding video information to collaboration system 416 for distribution on the session. Client device 417 also captures and delivers video of remote scene 433 to collaboration system 416.

Collaboration system 416 transmits the video information, possibly as separate video streams but also possibly as an integrated video stream, to client device 419, for presentation within a collaboration environment. Collaboration system 416 may also transmit the video information to client device 417 for presentation within a collaboration environment. Collaboration environments 501, 601, and 631, discussed with respect to FIG. 5 and FIG. 6, are representative of such a collaboration environment.

Upon selection of an object of interest, client device 419 responsively identifies a portion of the video corresponding to the object of interest and presents a separate view of the object of interest within the collaboration environment. User 409 may optionally determine to share a view with other collaboration participants, such as user 407 discussed above with respect to FIG. 6. In such a case, client device 419 may communicate the share option to client device 417. Client device 417 may then identify the portion of the video corresponding to the object of interest and may present the portion of the video within a separate view.

Various implementations discussed above and illustrated in the drawings involve computing software that may be delivered according to a variety of models, such as locally installed, hosted, and streaming models. In addition to the delivery model, the functionality provided by the software may be distributed according to a server-client model. In such implementations, some functions may be embodied in server software and implemented by a server computer system, while other functions may be embodiment in client software and may be implemented in a client computer system.

In one server-client implementation, a collaboration process may be implemented in program instructions executable by one or multiple computing systems to facilitate collaboration environments. The program instructions may include server program instructions that when executed direct a server computing system to at least transfer for delivery to a client device video information for presentation within a collaboration environment. The video information that includes a collaboration scene captured by a collaboration capture device and a remote scene captured by a remote capture device. The server program instructions may also direct the server computing system to identify a portion of the collaboration scene corresponding to an object of interest identified by the client device for separate viewing within the collaboration environment and transfer for delivery to the client device separate video information including the portion of the collaboration scene corresponding to the object of interest.

The program instructions may also include client program instructions that when executed direct a client device to at least receive the video information and present an initial view of the collaboration scene. The client program instructions may also direct the client device to receive an indication of the object of interest, identify the object of interest to the server computing system, and receive the separate video information. The client device may present within the collaboration environment a separate view including the portion of the collaboration scene corresponding to the object of interest.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. One or more computer readable storage devices having stored thereon program instructions for facilitating a collaboration environment that, when executed by a computing system, direct the computing system to at least:
   initiate a presentation, within the collaboration environment, of an initial view of a collaboration scene captured in a video stream;
   identify a portion of the collaboration scene corresponding to an object of interest in the collaboration scene selected for separate viewing;
   initiate a separate presentation, within the collaboration environment, of a separate view comprising the portion of the collaboration scene corresponding to the object of interest;
   modify the initial view of the collaboration scene to a modified view and present the modified view of the collaboration environment simultaneously with the separate view of the collaboration environment; and
   wherein the program instructions further direct the computing system to present a remote view simultaneously with the separate view, the remote view comprising a scene remote from the collaboration scene.

2. The one or more computer readable storage devices of claim 1 wherein the program instructions further direct the computing system to present a plurality of collaboration options within a collaboration option menu with respect to at least the object of interest and initiate a collaboration function, with respect to the object of interest, corresponding to a collaboration option selected from the plurality of collaboration options.

3. The one or more computer readable storage devices of claim 2 wherein the program instructions further direct the computing system to receive a selection of the object of interest, and wherein the program instructions direct the computing system to identify the portion of the collaboration scene corresponding to the object of interest in response to receiving the selection.

4. The one or more computer readable storage devices of claim 3 wherein the program instructions further direct the computing system to identify a second portion of the collaboration scene corresponding to a second object of interest in the scene also selected for separate viewing and present a second separate view simultaneously with the separate view, the second separate view comprising the second portion of the collaboration scene.

5. The one or more computer readable storage devices of claim 1 wherein the modified view is smaller than the initial view.

6. The one or more computer readable storage devices of claim 1 wherein the object of interest comprises a participant in a collaboration session with a plurality of other participants.

7. The one or more computer readable storage devices of claim 1 wherein the initial view comprises a video presentation window and wherein the collaboration environment comprises the video presentation window and an instant message presentation window.

8. A method for facilitating a collaboration environment, the method comprising:
   presenting within the collaboration environment an initial view of a collaboration scene captured in a video stream;
   identifying a portion of the collaboration scene corresponding to an object of interest in the collaboration scene selected for separate viewing;
   presenting within the collaboration environment a separate view in a separate presentation, the separate view comprising the portion of the collaboration scene corresponding to the object of interest;
   modifying the initial view of the collaboration scene to a modified view;
   presenting the modified view of the collaboration environment simultaneously with the separate view of the collaboration environment;
   presenting a plurality of collaboration options within a collaboration option menu with respect to at least the object of interest and initiating a collaboration function, with respect to the object of interest, corresponding to a collaboration option selected from the plurality of collaboration options; and presenting a remote view simultaneously with the separate view, the remote view comprising a scene remote from the collaboration scene.

9. The method of claim 8 further comprising receiving a selection of the object of interest, wherein identifying the portion of the collaboration scene corresponding to the object of interest occurs in response to receiving the selection.

10. The method of claim 9 further comprising identifying a second portion of the collaboration scene corresponding to a second object of interest in the scene also selected for separate viewing and presenting a second separate view simultaneously with the separate view, the second separate view comprising the second portion of the collaboration scene.

11. The method of claim 8 wherein the modified view is smaller than the initial view.

12. The method of claim 8 wherein the initial view comprises a video presentation window and wherein the collaboration environment comprises the video presentation window and an instant message presentation window.

13. A computing apparatus comprising:
one or more computer readable storage devices;
a processing system operatively coupled with the one or more computer readable storage devices; and
program instructions stored on the one or more computer readable storage devices for facilitating a collaboration environment that, when executed by the processing system, direct the processing system to at least:
initiate a presentation, within the collaboration environment, of an initial view of a collaboration scene captured in a video stream;
identify a portion of the collaboration scene corresponding to an object of interest in the collaboration scene selected for separate viewing;
initiate a separate presentation, within the collaboration environment, of a separate view comprising the portion of the collaboration scene corresponding to the object of interest;
modify the initial view of the collaboration scene to a modified view and present the modified view of the collaboration environment simultaneously with the separate view of the collaboration environment; and
wherein the program instructions further direct the processing system to present a remote view simultaneously with the separate view, the remote view comprising a scene remote from the collaboration scene.

14. The computing apparatus of claim 13 wherein the program instructions further direct the processing system to present a plurality of collaboration options within a collaboration option menu with respect to at least the object of interest and initiate a collaboration function, with respect to the object of interest, corresponding to a collaboration option selected from the plurality of collaboration options.

15. The computing apparatus of claim 14 wherein the program instructions further direct the processing system to receive a selection of the object of interest, and wherein the program instructions direct the processing system to identify the portion of the collaboration scene corresponding to the object of interest in response to receiving the selection.

16. The computing apparatus of claim 15 wherein the program instructions further direct the processing system to identify a second portion of the collaboration scene corresponding to a second object of interest in the scene also selected for separate viewing and present a second separate view simultaneously with the separate view, the second separate view comprising the second portion of the collaboration scene.

17. The computing apparatus of claim 15 wherein the modified view is smaller than the initial view.

* * * * *